(12) United States Patent
Hauser et al.

(10) Patent No.: US 7,415,758 B2
(45) Date of Patent: Aug. 26, 2008

(54) DEVICE TO PRESS THE SHAFT OF A ROTOR INTO A STATOR HOUSING

(75) Inventors: Hubert Hauser, Balgheim (DE); Uwe Moench, Spaichingen (DE)

(73) Assignee: Minebea Co., Ltd., Miyota-machi (JP)

( * ) Notice: Subject to any disclaimer, the term of this patent is extended or adjusted under 35 U.S.C. 154(b) by 245 days.

(21) Appl. No.: 10/937,115

(22) Filed: Sep. 8, 2004

(65) Prior Publication Data

US 2005/0050723 A1    Mar. 10, 2005

(30) Foreign Application Priority Data

Sep. 10, 2003    (DE)    .................. 103 43 317
Sep. 30, 2003    (DE)    .................. 103 47 477

(51) Int. Cl.
*H02K 15/06* (2006.01)
(52) U.S. Cl. .................. 29/736; 29/732; 29/734; 29/596; 29/598; 100/291
(58) Field of Classification Search .......... 29/596–598, 29/732–736, 738, 281.5; 414/737; 310/42, 310/269, 218; 100/291
See application file for complete search history.

(56) References Cited

U.S. PATENT DOCUMENTS

| 4,383,356 | A | * | 5/1983 | Fichtner | 29/598 |
| 4,739,549 | A | * | 4/1988 | Rist | 29/736 |
| 5,062,200 | A | * | 11/1991 | Lanfranco | 29/732 |
| 5,272,803 | A | * | 12/1993 | Harrison et al. | 29/596 |
| 5,495,660 | A |   | 3/1996 | Choi |  |
| 5,636,426 | A |   | 6/1997 | Luckhardt et al. |  |
| 6,544,102 | B2 | * | 4/2003 | Schafer et al. | 451/5 |
| 6,684,489 | B2 | * | 2/2004 | Suzuki | 29/732 |
| 6,753,636 | B2 |   | 6/2004 | Rehm et al. |  |

FOREIGN PATENT DOCUMENTS

| DE | 42 11 276 | 10/1993 |
| DE | 100 26 467 | 12/2001 |
| JP | 09009591 | 1/1997 |

* cited by examiner

*Primary Examiner*—Minh Trinh
(74) *Attorney, Agent, or Firm*—Lipsitz & McAllister LLC

(57) ABSTRACT

A device to press a rotatably supported shaft of a rotor of a spindle motor for a hard disk drive into a shaft receiving portion of an associated stator housing by means of a first pressing tool acting on the rotor and a second pressing tool acting on the stator housing. A first aligning apparatus for the rotor and a second aligning apparatus for the stator housing are provided. The first and second aligning apparatuses are formed in such a way that they guide the rotor by means of a rotor carrier and the stator housing by means of a stator carrier. The rotor carrier and the stator carrier are exactly aligned with respect to each other during the pressfitting process. The first pressing tool has a first pressing element acting on the shaft of the rotor that is independent of the first aligning apparatus and the second pressing tool has a second pressing element acting on the stator housing that is independent of the second aligning apparatus. The first and second pressing elements abut against the shaft or the stator housing respectively, at the latest at the start of the pressfitting process.

29 Claims, 5 Drawing Sheets

DEVICE TO PRESS THE SHAFT OF A ROTOR INTO A STATOR HOUSING

The present disclosure relates to the subject matter disclosed in German applications No. 103 43 317.1 of Sep. 10, 2003 and No. 103 47 477.3 of Sep. 30, 2003, which are incorporated herein by reference in their entirety and for all purposes.

BACKGROUND OF THE INVENTION

The invention relates to a device to press a rotatably supported shaft of a rotor of a spindle motor for a hard disk drive into a shaft receiving portion of an associated stator housing by means of a first pressing tool acting on the rotor and a second pressing tool acting on the stator housing.

In the devices known to date, the force to press the shaft into the shaft receiving portion via the rotor and the stator housing is introduced in such a way that process tolerances are created on the one hand, and damage to the bearing system can also not be excluded on the other hand.

The object of the invention is therefore to improve a device to press the shaft of the rotor into the shaft receiving portion inasmuch as high manufacturing precision, with low process tolerances in particular, can be achieved.

SUMMARY OF THE INVENTION

This object has been achieved in accordance with the invention by a device of the type described in the opening paragraphs in that a first aligning apparatus for the rotor and a second aligning apparatus for the stator housing are provided, that the first and second aligning apparatuses are formed in such a way that they guide the rotor by means of a rotor carrier and the stator housing by means of a stator carrier exactly aligned with respect to each other at least during the pressfitting process, and that the first pressing tool has a first pressing element acting on the shaft of the rotor that is independent of the first aligning apparatus and the second pressing tool has a second pressing element acting on the stator housing that is independent of the second aligning apparatus, the first and second pressing elements fitting snugly against the shaft or the stator housing respectively, at the latest at the start of the pressfitting process.

The advantage of the solution according to the invention is to be seen in the fact that the aligning apparatuses acting independently of the pressing elements make it possible for the rotor and the stator housing to be precisely aligned to each other during the pressfitting process and to be then held in a precisely aligned state, allowing the pressfitting process to be carried out with high precision in respect of the alignment of the two parts to each other.

The exact alignment of the rotor can be achieved in a particularly advantageous manner if the rotor, at least from the start of the pressfitting process, is held in a precisely aligned state in that a precision-related surface of the rotor engages against a first support surface of the rotor carrier of the first aligning apparatus with a defined first holding force.

In that a defined holding force holds down the precision-related surface, the disk supporting surface of the rotor for example, onto the first support surface of the rotor carrier, the exact alignment of the rotor determined by the first support surface of the rotor carrier can be maintained throughout the pressfitting process from the very beginning.

Within the scope of the solution according to the invention, the first aligning apparatus can either be associated with one of the pressing tools or arranged entirely independently of the pressing tools.

A particularly favorable solution provides that the first aligning apparatus is associated with the first pressing tool.

In order to achieve and maintain the exact alignment of the rotor, it is particularly favorable if the first support surface of the rotor carrier can be movably guided with respect to the first pressing element, so that, independent of the pressing force exerted with the first pressing element, the first holding force between the precision-related surface of the rotor and the support surface of the rotor carrier can be maintained.

A particularly favorable realization provides that the rotor carrier is movably guided by means of at least one first linear guide of the first aligning apparatus.

To maintain high guiding precision in the aligning apparatus, it is preferable if the first linear guide is supported by rolling element bearings, preferably having no free play.

The first linear guide preferably comprises a guide column and a first guide sleeve that is movable with respect to the guide column.

In respect of the association of the rotor carrier with the guide column and the guide sleeve, such association can basically take a large variety of conceivable forms. A particularly favorable association provides for the rotor carrier to be mounted on the first guide sleeve.

In principle, the linear guide can be independent of the arrangement of the pressing element. A particularly compact design can be realized, however, if the first pressing element is mounted on the guide column.

To advantageously generate the holding force with which the precision-related surface of the rotor is to engage against the first support surface of the rotor carrier, it is preferably provided that the rotor carrier can be moved in the direction of the pressing tool located opposite the rotor carrier until it reaches a starting position, that a first holding force acting in the direction of the starting position is exerted on the rotor carrier, that the rotor supported by the rotor carrier, in the starting position with the shaft, is spaced from the first pressing element and that a movement of the rotor with the shaft in the direction of the first pressing element works against the first holding force.

In order to prevent any damage whatsoever to the pair of bearings used to support the rotor on the shaft, it is preferable if the holding force is less than 1.5 times the preload force of a pair of bearings provided between the shaft and the rotor, and even more preferable if it is less than this preload force.

The holding force can basically be generated in a large variety of different ways. It is particularly favorable if the first holding force can be generated by an energy or force storage unit acting between the rotor carrier and a base of the first pressing tool, preferably an elastic force storage unit.

In relation to the embodiments of the solution according to the invention mentioned up to this point, only the first holding force to achieve the exact alignment of the rotor has been dealt with.

To prevent the rotor from being attracted to the stator due to magnetic interaction before the pressfitting process has begun and thus possibly becoming partially disengaged from the rotor receiving portion and consequently losing its alignment, it is preferable if, before the pressfitting process begins, the precision-related surface of the rotor can be butted against the first support surface of the rotor carrier by means of a first applying force.

The applying force goes to prevent the rotor from disengaging from the rotor receiving portion in the manner described above.

The first applying force is preferably dimensioned in such a way that it is less than the first holding force but greater than the effective force produced by the magnetic interaction between the rotor and the stator.

The first applying force can be preferably generated by a force transmission element which becomes effective as the first pressing tool and the second pressing tool approach each other before the start of the pressfitting process.

It is particularly favorable if the first force transmission element is disposed on the second pressing tool and can thus be easily put into effect.

So far, no precise details have been given in relation to the above explanation of the device according to the invention concerning the alignment of the stator housing. A further beneficial embodiment of the invention provides for the stator housing, at the latest at the start of the pressfitting process, to be held in a precisely aligned state in that one or more precision-related surfaces of the stator housing, reference or mounting surfaces for example, abut a second support surface of the stator carrier of the second aligning apparatus. This also goes to ensure that during the pressfitting process the stator housing is always held precisely aligned in the required manner.

The second aligning apparatus can be associated with the second pressing tool.

It is, however, conceivable that in another solution, the second aligning apparatus is associated with the first pressing tool.

In order to maintain the second holding force throughout the pressfitting process, it is preferable if the second support surface of the stator carrier can be movably guided with respect to the second pressing element.

Such guided movement can be achieved, for example, in that the stator carrier is movably guided by at least one second linear guide of the second aligning apparatus.

The second linear guide is preferably supported by rolling element bearings.

In the simplest case, provision is made for such a second linear guide to comprise a second guide column and a second guide sleeve which can be moved with respect to the second guide column.

The way in which the guide sleeve and the guide column are associated with the stator carrier can basically be chosen arbitrarily.

A beneficial solution provides for the guide sleeve to carry the stator carrier. However, it is also conceivable to arrange the guide column in such a way that it carries the stator carrier.

Moreover, the guide sleeve and guide column can be arranged entirely independently of the second pressing element.

A particularly compact design provides for the second guide column to carry the second pressing element.

Another beneficial solution provides that, as a stator carrier, the second aligning apparatus has a carrying member guided by a plurality of linear guides.

Such a carrying member can be particularly advantageously employed if it were to have a plurality of second support surfaces for the precision-related surfaces of the stator housing.

So far, no precise details have been given concerning the generation of the second holding force. A particularly beneficial embodiment thus provides that the stator carrier can be moved in the direction of the pressing tool located opposite the stator carrier until it reaches a starting position, that a second holding force acting in the direction of the starting position is exerted on the stator carrier, that the stator housing held by the stator carrier is spaced at a distance from the second pressing element and that the second holding force works against a movement of the stator housing with the stator carrier in the direction of the second pressing element.

The second holding force is also preferably selected in such a way that no deformation of the stator housing can occur.

The second holding force can be generated in a particularly favorable way when it is generated by a force storage unit acting between the stator carrier and a base of the associated pressing tool, preferably an elastic spring force storage unit.

To prevent the stator housing from becoming at least partially disengaged from the stator receiving portion due to the magnetic attraction of the rotor and the stator as the rotor and the stator approach each other before the actual pressfitting process, it is preferably if, before the start of the pressfitting process, the precision-related surfaces of the stator housing can be supported on the second support surface by means of a second applying force. Here, the second applying force, for example, can be less than the first holding force but always strong enough so as not to be overcome by the magnetic attraction between the rotor and the stator.

Such an applying force can preferably be generated by at least one force transmission element which becomes effective when the first pressing tool is conveyed in the direction of the second pressing tool, that is when the two pressing tools are brought together.

The second force transmission element is preferably disposed on the first pressing tool.

To ensure a centric alignment of the stator housing and rotor shaft at the start of the pressfitting process, a centering element is also preferably provided.

The centering capability of this element is particularly effective if it acts on the shaft receiving portion of the stator housing.

In order to pressfit the rotor up to a defined spacing of the precision-related surface of the rotor and stator housing, one of the two interacting elements of a measuring device is preferably associated with the first support surface and the second support surface respectively to measure a precise spacing between these two surfaces.

It is preferable if the measuring device generates a signal for the control of a drive motor when a defined, predetermined spacing between the first support surface and the second support surface is reached.

The first and second support surfaces can be particularly precisely positioned with respect to each other when the measuring device is part of a closed-loop circuit of the control of the drive motor.

In particular, the spacing between the first support surface and the second support surface can be achieved with great repeat accuracy when the control operates the drive motor in a section before an expected pressfit end as a stepping motor operating in start-stop mode, providing the possibility of ending the movement of the second pressing tool with respect to the first pressing tool with stepped precision.

Furthermore, to prevent damage to the pressing tools, or also to the rotor or stator housing, from occurring, it is preferable if a force sensor is provided between a press drive and the associated pressing element, making it possible to detect whether atypically high force peaks occur during the course of the pressing process.

Such a force sensor is preferably disposed in an open control loop of the press control, allowing the press control to detect the occurrence of unexpected, large forces and to switch off the press drive.

In order to achieve the greatest possible accuracy, it is preferable if the press drive is a spindle drive.

Further characteristics and advantages of the invention form the subject matter of the description below as well as the illustration in drawings of several embodiments.

DETAILED DESCRIPTION OF THE INVENTION

Figure 1:
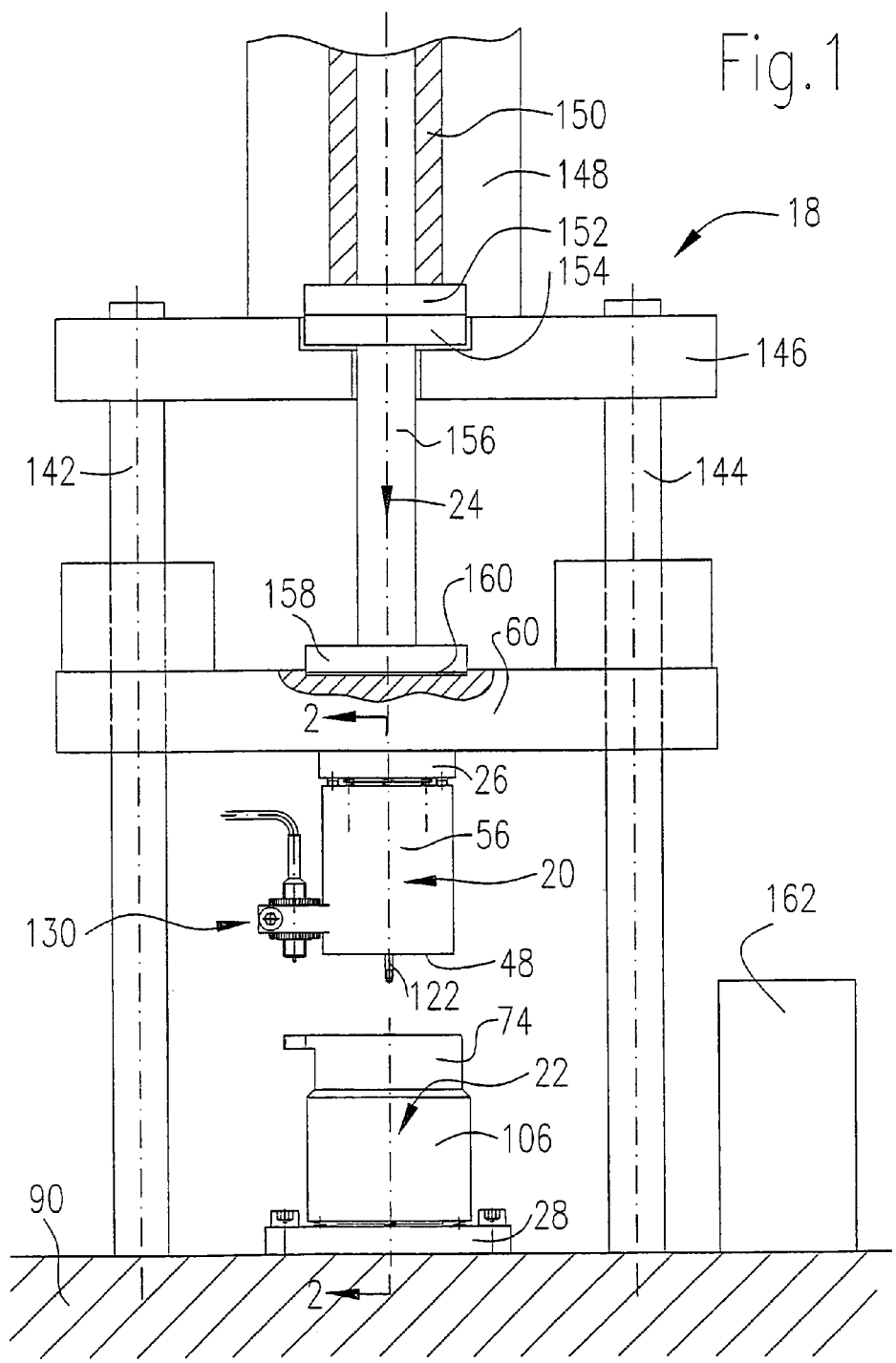
FIG. 1 a schematic view of a first embodiment of a device according to the invention to pressfit the shaft of a rotor for a spindle motor into the corresponding stator housing.

A first embodiment of a device according to the invention illustrated in FIG. 1 to 4 to pressfit a shaft 10, to which a rotor 12 of a spindle motor is mounted by means of a pair of bearings 11, into the shaft receiving portion 14 of a stator housing 16 of a stator 15 (FIG. 2) of the spindle motor comprises a pressing device 18 (FIG. 1), described in more detail below, having a first pressing tool 20 acting on the rotor 12 and a second pressing tool 22 acting on the stator housing 16, which can be moved towards each other in a pressing direction 24, the first pressing tool 20 being connected to the pressing device 18 via a first base 26 and the second pressing tool 22 being connected to the pressing device 18 via a second base 28.

For its part, the first pressing tool 20 comprises a first pressing element 30 provided with a first pressing surface 32 with which a force can be exerted on an end face 38 of the shaft 10 located opposite an end face 36 disposed at a pressfit end 34 of the shaft 10 for the purpose of pressfitting the pressfit end 34 into the shaft receiving portion 14.

To align the rotor 12 when the shaft 10 is pressed into the shaft receiving portion 14, a first aligning apparatus, indicated in its entirety by 40 and associated with the first pressing tool 20 is provided which has a rotor carrier 42 provided with a rotor receiving portion 44. The rotor receiving portion 44 is preferably formed as a negative pressure receiving portion and provided with a suction connection 45 so that the rotor 12 can be held with its hub 47 in the rotor receiving portion 44 through negative pressure.

The rotor 12 with its hub 47 can be inserted into the rotor receiving portion 44 in such a way that it can be butted with a disk supporting surface 46 formed as a precision-related surface against a first support surface 48 of the rotor carrier 42, enabling the rotor 12 to be precisely aligned by means of the rotor carrier 42.

The rotor carrier 42 is guided by a first guide 50 in the pressing direction 24 linearly movable with respect to the first pressing element 30, the first guide 50 comprising a first guide column 52 held on the first base 26 and a first guide sleeve 56 precisely guided with respect to the first guide column 52 by means of rolling elements 54, the first guide sleeve 56 being provided with the rotor carrier 42 on the side facing the second pressing tool 22.

By means of first spring elements 58 acting on the rotor carrier 42, the rotor hub 47 is held, without additional outside force being exerted, by the rotor carrier 42 with respect to the first pressing element 30, in a first starting position in which the first pressing element 30 does not act on the end face 38 of the shaft 10, but is rather spaced at a distance from it.

The first spring elements 58 are supported on the one hand by the base 26 and on the other hand they exert a force on the first guide sleeve 56 in a direction heading away from the base 26 in order to hold the rotor carrier 42 with respect to the base 26 in the starting position defined by stops.

The overall first holding force exerted by the first spring elements 58 is less than 1.5 times the bearing preload force of the pair of roller bearings 11 so that overcoming the holding force H1 with effect on the shaft 10, its end face 36 for example, avoids damaging the pair of bearings 11.

For its part, the first guide column 52 is firmly seated via the baseplate 26 on a plunger 60 of the pressing device 18 and can be moved in the pressing direction 24 by a movement of the plunger 60. Moreover, the first guide column 52 carries the first pressing element 30 at the end 62 facing the second pressing tool 22, the first pressing element 30 being firmly connected to the first guide column 52.

The first guide 50 is preferably formed in such a way that the first guide column 52 is a cylindrical column, the rolling elements 54 fitting snugly against its sleeve surface 64 and preferably being held in a conventional rolling element cage 65, the first guide sleeve 56 supporting itself against the rolling elements 54 with its inner surface 66, and in this way being guided along the first guide column 52 via the rolling elements 54. The inner surface 66 is likewise preferably formed as a cylindrical surface, the sleeve surface 64 and the inner surface 66 extending coaxial to a cylindrical axis 68 that is aligned parallel to the pressing direction 24.

To align the stator housing 16, formed for example as a flange in the spindle motor of the first embodiment, a second aligning apparatus 70, associated with the second pressing tool 22, is provided, the second aligning apparatus 70 comprising a stator carrier 72 having a stator receiving portion 74 in which the stator housing 16 can be placed in such a way that the stator housing 16 with a mounting surface 76 as a precision-related surface of the stator housing 16 engages against a second support surface 78 of the stator carrier 72, in this case the stator housing 16 penetrating with its hub member 77 into the stator receiving portion 74.

To exert a force on the stator housing 16 in the region of the shaft receiving portion 14, a second pressing element, indicated in its entirety by 80, is provided which, with a second pressing surface 82, can act on a contact surface 86 of the stator housing 16 located opposite a pressfit opening 84 in the shaft receiving portion 14, disposed on the stator housing 16 and preferably enclosing the shaft receiving portion 14.

Here, for example, the second pressing element 80 is supported on a counter support 90 to the plunger 60 of the pressing device 18 via a second base 28, with respect to which the plunger 60 can be moved.

To guide the second aligning apparatus 70 with respect to the second pressing element 80 a second guide, indicated in its entirety by 100, is provided which comprises a second guide column 102 and a second guide sleeve 106 journalled on this guide column 102 via rolling elements 104, the second guide sleeve 106 being provided with the stator carrier 72 and a second spring element 108 exerting a second holding force H2 on the second guide sleeve in such a way that the second guide sleeve 106, and thus the second aligning apparatus 70, are in a starting position in which the stator housing 16, accommodated in the stator receiving portion 74, abuts the second support surface 78 with the mounting surface 76, no force being exerted, however, on the stator housing 16 in the region of its contact surface 86 by the second pressing surface 82.

The second spring element 108 is preferably supported on the base 28 of the second pressing tool 22 mounted on the counter support 90.

The second guide column 102 is preferably seated on the base 28 and carries. the second pressing element 80 on the end located opposite the counter support 90.

Furthermore, the second pressing element 80 is allocated a centering pin 110 which is held by a guide bolt 112 reaching through the second guide column 102, a force being exerted on the guide bolt 112 via a pressure cylinder 114 in a direction of pressure 116 running opposite to the pressing direction 24.

The centering pin 110 projects beyond the pressing element 80 in such a way that, in a starting position of the pressing tools 20, 22, the centering pin 110 engages into the shaft receiving portion 14 and uses this to center the stator housing 16 with respect to the second pressing tool 22 so that the shaft receiving portion 14 is aligned coaxial to the shaft 10 of the rotor 12 held by the first pressing tool 20.

The center pin 110 further engages through the shaft receiving portion 14 and, as an applying element, exerts a force with its end face 118 on the end face 36 of the shaft 10 disposed at the pressfit end 34 before this end face 36 enters into the shaft receiving portion 14 when the pressing tools 20, 22 are brought together, in order to support the rotor 12 in a stable way, despite incipient magnetic attraction between the rotor 12 and the stator 15, with its disk supporting surface 46 on the first support surface 48 using an applying force A1 and to thus precisely align the rotor 12, together with the shaft 10, before the pressfitting process.

The first applying force A1 acting on the shaft 10 is to be preferably dimensioned in such a way that it is less than a preload force of the pair of bearings 11 in order to prevent the pair of bearings 11 from being damaged due to applying force A1.

In order to further ensure that the stator housing 16 abuts the second support surfaces 78 with its mounting surfaces 76 by means of a second applying force A2 before the shaft 10 is pressfitted and, despite incipient magnetic attraction between the rotor 12 and the stator 15, continues to be held in close contact, a holding-down apparatus 120 is provided having holding-down devices 122 on which a force is exerted by means of pressure springs 124.

The holding-down apparatus 120 is integrated, for example, in the first aligning apparatus 40, the holding-down devices 122 being formed as pins lodged in bores 126 in the rotor carrier 42, on which a force is exerted by pressure springs 124 disposed in bores 128 in the first guide sleeve 56 in such a way that the holding-down devices 122 project beyond the first aligning apparatus 40 in the direction of the second pressing tool 22 and thus, when the first pressing tool 20 is moved in the pressing direction 24 towards the second pressing tool 22, exert a force on the stator housing 16 on an end located opposite the mounting surface 76 and thus support the mounting surface 76 with this exerted force on the second support surface 78.

In order to form the second applying force A2 exerted by the holding-down devices 122 independently of the force acting on the first guide sleeve 56 generated by the spring elements 58, the pressure springs 124 are supported directly on the base 26 of the first pressing tool 20.

Figure 3:
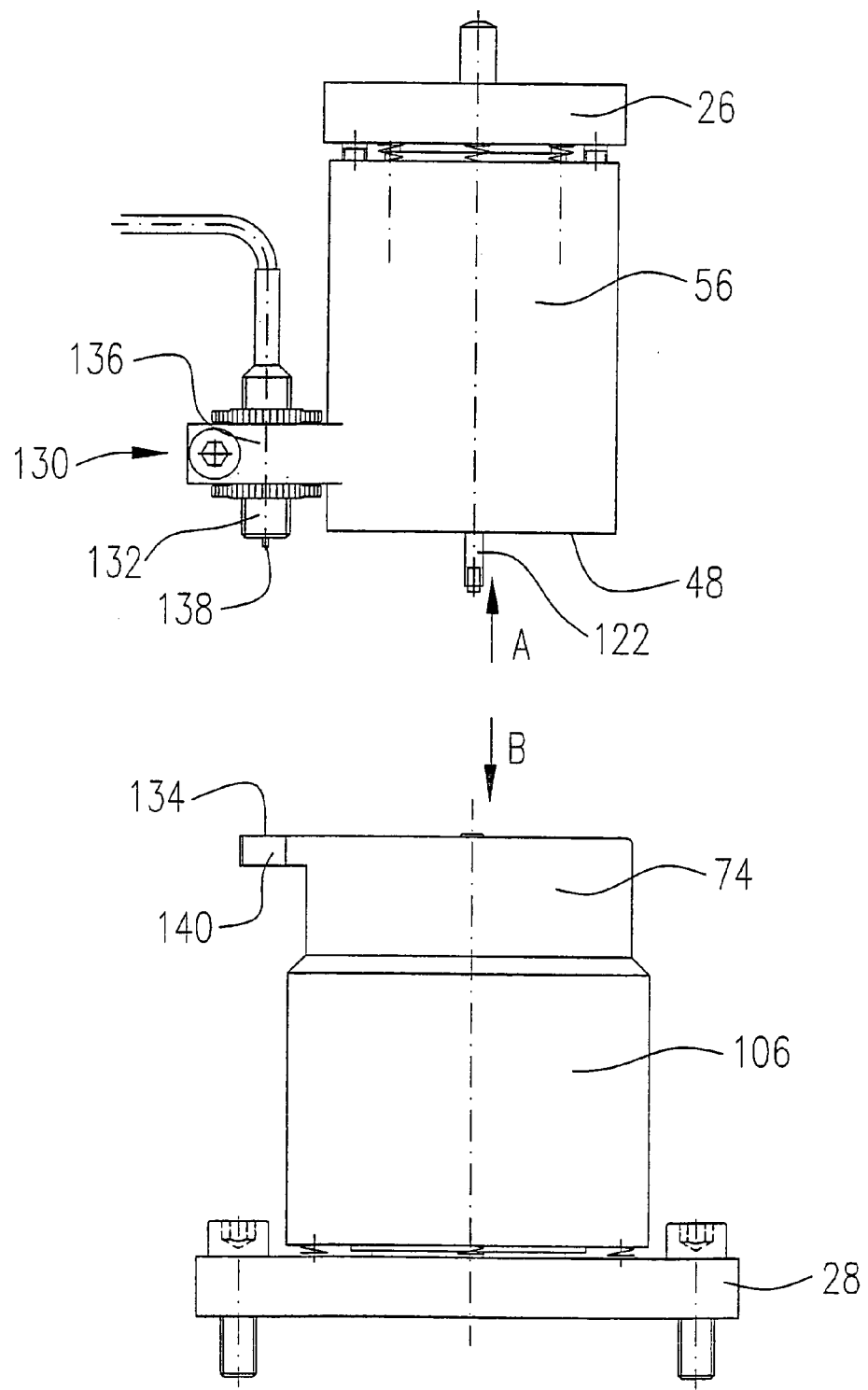
FIG. 3 an enlarged view of a measuring device according to the invention.
Figure 4A:
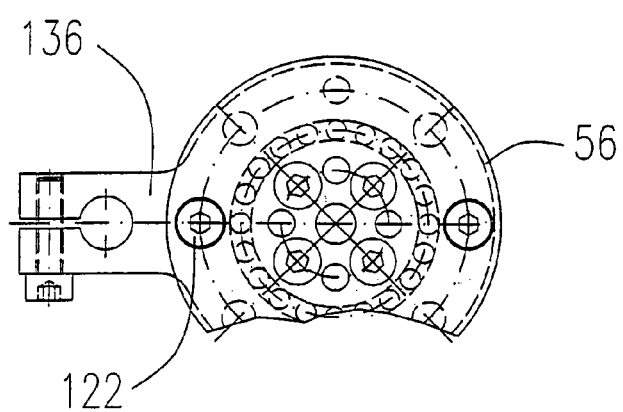
FIG. 4 a view from above in the direction of the arrows A (FIG. 4a) and B (FIG. 4b) in FIG. 3 of the first pressing tool and the second pressing tool and FIG. 5 a section similar to FIG. 2 through the pressing tools of a second embodiment of a device according to the invention.
Figure 4B:
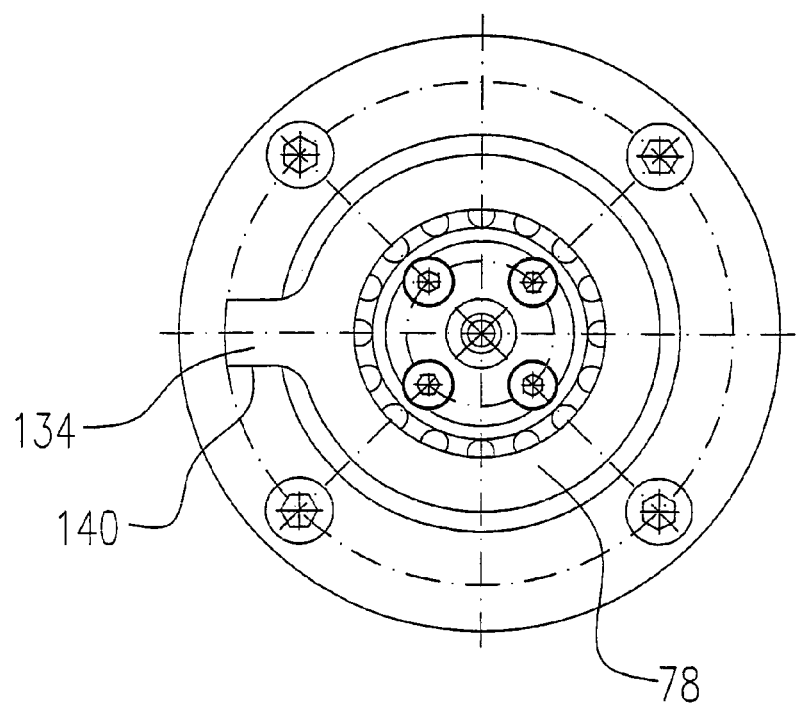

In order to achieve a defined spacing between the mounting surface 76 of the stator housing 16 and the disk supporting surface 46 of the rotor hub 47 when the shaft 10 is pressed into the shaft receiving portion 14, and to ensure that it is reproducible, a measuring device 130, illustrated in FIG. 1 and 3, is provided comprising a measuring probe 132, firmly positioned in the pressing direction 24 with respect to the first support surface 48, and a sensor contact surface 134, firmly positioned in the pressing direction 24 with respect to the second support surface 78, the measuring probe 132 being held by a probe holder 136 disposed on the rotor carrier 42 in which the measuring probe 132 can be fixed in a defined alignment so that a probe needle 138 is in a defined position to the first support surface 48 in the pressing direction 24, while the sensor contact surface 134 is likewise disposed in a defined alignment to the second support surface 78 by means of an appendage 140 formed on the stator receiving portion 74.

The measuring probe 132 can now be aligned with respect to the first support surface 48 in the pressing direction 24 in such a way that, with the probe needle 138 engaging on the sensor contact surface 138, the measuring probe 132 releases a signal exactly when the disk supporting surface 46 is at the desired predetermined distance from the mounting surface 76.

A measuring probe is any device which is capable of registering the desired position and emitting a signal with a sufficient degree of precision.

The pressing device 18 mentioned earlier comprises two guide columns 142, 144 rising from the counter support 90 that are connected by a cross bar 146. on which a drive motor 148, having a rotor with a hollow shaft 150, is arranged.

The hollow shaft 150 drives a spindle nut 154 via a coupling 152, the spindle nut 154 being seated on a sliding spindle 156 which can be pushed into the hollow shaft 150.

The sliding spindle 156 is fixedly connected to the plunger 60 via a flange 158, the plunger 60 in turn being precisely aligned and movably guided on the two guide columns 142 and 144 in the pressing direction 24 in order to thus also guide the first pressing tool 20 to the second pressing tool 22 in a perfectly aligned manner.

To register the force acting on the plunger 60, a force sensor 160 is provided between the flange 158 and the plunger 60, the force sensor 160 being connected to a pressing control 162 which not only registers the values of the force sensor 160 but also the switching signals of the measuring probe 132.

The device according to the invention now works such that the first pressing tool 20 and the second pressing tool 22 are pushed by the control 162, by moving the plunger 60 in the opposite direction to the pressing direction 24, so far apart from each other that the rotor 12 with its rotor hub 47 can be placed in the rotor receiving portion 44 of the rotor carrier 42, the rotor hub 47 initially being held in the rotor receiving portion 44 by negative pressure so that the rotor 12 cannot fall out of the rotor receiving portion 44 due to the force of gravity.

Moreover, the stator 15 with the stator housing 16 is inserted into the stator receiving portion 74, the centering pin 110 jutting through the shaft receiving portion 14 and thus centering the stator housing 16 via the shaft receiving portion 14.

Then, by activating the control 162, the plunger 60 with the first pressing tool 20 is moved by means of the drive motor 148 in the direction of the second pressing tool 22, the hollow shaft 150 driving the spindle nut 154 via the coupling 152 which moves the sliding spindle 156 that is fixedly connected to the plunger 60 in the direction of the counter support 90 of the pressing device 18.

Figure 2:
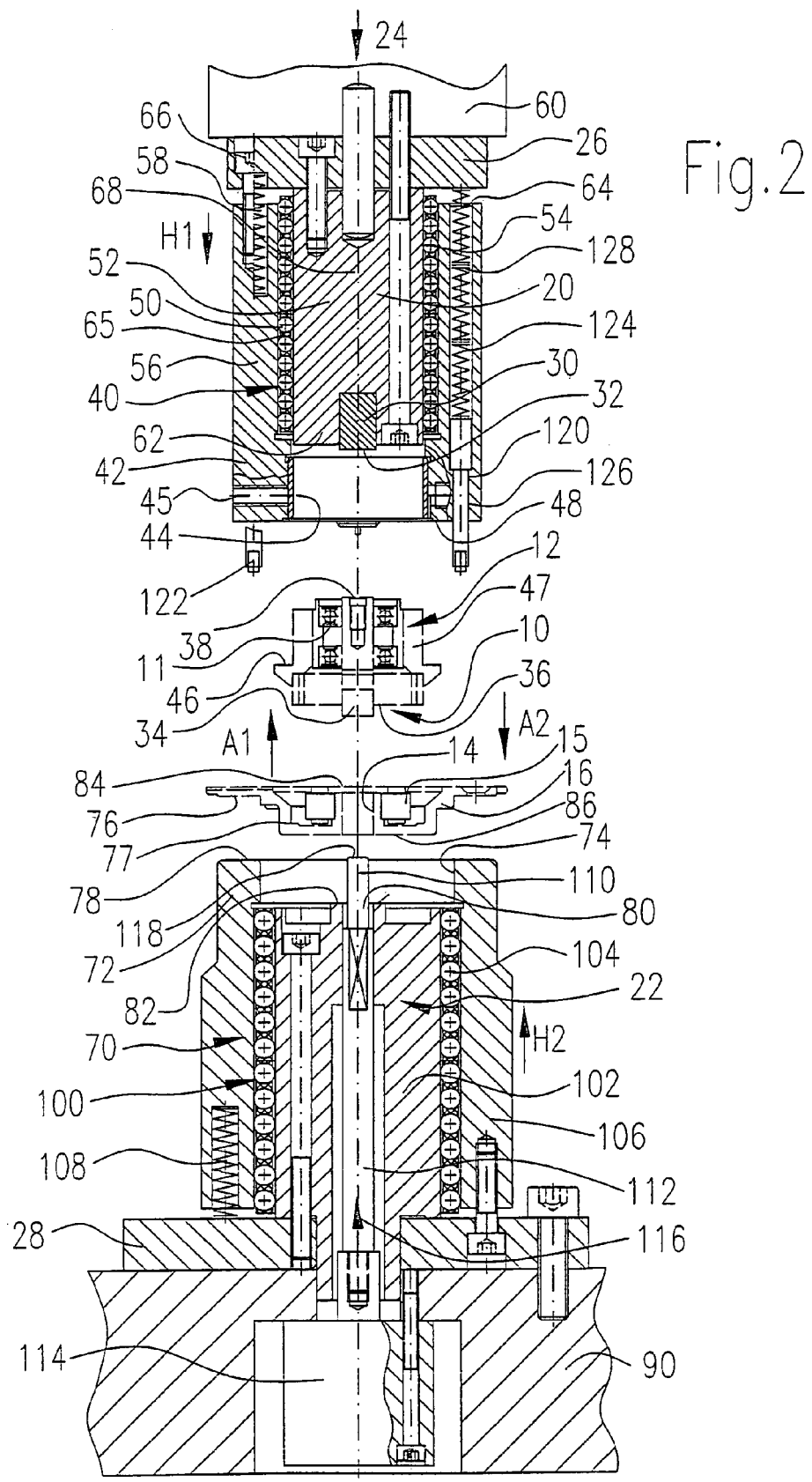
FIG. 2 an enlarged view of a first and second pressing tool as a section along line 2-2 in FIG. 1.

Before the actual process of pressing the pressfit ends 34 of the shaft 10 into the shaft receiving portion 14 begins, as can be seen in FIG. 2, the holding-down devices 122 of the holding-down apparatus 120 touch the stator housing 16 on the surface facing away from the mounting surface 76 and press the stator housing 16 with the mounting surface 76 against the second support surface 78 of the stator carrier 72 with applying force A2.

Here, applying force A2 is less than holding force H2 with which the stator carrier 72 is held in the starting position described above in which the stator housing 16 does not yet touch the second pressing surface 82.

This force is sufficient, when the first pressing tool 20 and the second pressing tool 22 are brought closer together, to move the holding-down devices 122 in the direction opposite to the direction in which the pressure springs 124 work.

When the first pressing tool 20 and the second pressing tool 22 are brought even closer together, the centering pin 110 comes into contact with the end face 36 of the shaft 10 and thus exerts applying force A1 on the entire rotor 12 by means of which the disk supporting surface 46 is held in close contact with the first support surface 48 by means of this applying force A1.

Applying forces A1 and A2, acting in opposite directions to each other, are further so great that they counteract a magnetic attraction of the rotor 12 and the stator 15 so that, despite this magnetic attraction, the mounting surface 76 and the second support surface 78 as well as the disk supporting surface 46 and the first support surface 48 respectively remain in close contact with each other.

As the pressing tools 20 and 22 move even closer together, the pressfit end 34 of the shaft 10 then touches the pressfit opening 84 of the shaft receiving portion 14 and great forces now act not only on the shaft 10, and thus on the rotor, 12 but also on the stator housing 16.

These forces are so great that holding force H1 is overcome and the rotor 12 together with the rotor carrier 42 moves in the direction of the base 26 against the force of the first spring elements 58, and continues until the end face 38 of the shaft 10 abuts the first pressing surface 32.

Since this force acting on the rotor carrier 42 is transferred from the shaft 10 via the pair of bearings 11 to the rotor hub 47, holding force H1 should preferably be dimensioned in such a way that it is less than 1.5 times the preload force of the pair of bearings 11, so that the pair of bearings 11 cannot be damaged. Thus at the start of the pressfitting process, the disk supporting surface 46 and the first support surface 48 are pressed against each other with the first holding force H1, which goes to ensure that the rotor hub 47, and thus the rotor 12, is aligned in a stable and precise manner with respect to the stator housing 16, in particular that the shaft 10 with the pressfit end 34 is aligned coaxial with respect to the shaft receiving portion 14.

Likewise, at the start of the pressfitting process, the stator housing 16, together with the stator receiving portion 74, is also pushed in the direction of the base 28, overcoming the second holding force H2, until the contact surface 86 abuts the second pressing surface 82.

Holding force H2 is also dimensioned in such a way that it is at any event less than any resulting bending forces that can deform the stator housing 16, so that any changes in measurement resulting from distortion and/or deflection of the stator housing 16 can be prevented or excluded.

On the other hand, at the start of the pressfitting process the mounting surface 76 and the second support surface 78 are thereby pressed together with holding force H2 thus ensuring that the stator housing 16 is precisely aligned with respect to the rotor 12.

As the pressfitting process continues, the first pressing surface 32 and the end face 38 of the shaft 10 as well as the second pressing surface 82 and the contact surface 86 interact directly with each other so that the pressfit end 34 can be pressed into the shaft receiving portion 14 with as large a force as necessary.

To avoid damaging the pressing tools 20 and 22, the movement of the first pressing tool 20 in the direction of the second pressing tool 22 is monitored by the pressing control 162 coupled to the force sensor 160 in an open control loop and, if any large, atypical forces appear, the drive motor 148 is switched off.

Using a stepping motor as the drive motor 148 also creates the possibility of comparing the forces measured at the force sensor 160 with allowable and/or at least necessary forces associated with individual forward feed positions and to interrupt the pressing process should deviations occur.

In the spindle motors manufactured according to the invention, it is moreover necessary to carry out the process of pressing the shaft 10 into the shaft receiving portion 14 in such a way that the disk supporting surface 46 is disposed with an exact spacing from the mounting surface 76.

It is for this reason that the control 162 is coupled to the measuring device 130 and is thus able to maintain with stepped precision the forward feed of the drive motor, taking the form of a stepping motor in a closed control loop operating in start-stop mode, in the pressing direction 24 only until the first support surface 48 and the second support surface 78 have the predetermined spacing from each other, it being possible to preset the spacing by adjusting the measuring probe 132.

If the measuring probe 132 is precise enough, the process of pressing the shaft 10 into the shaft receiving portion 14 can be precisely repeated in the micrometer range.

Figure 5:
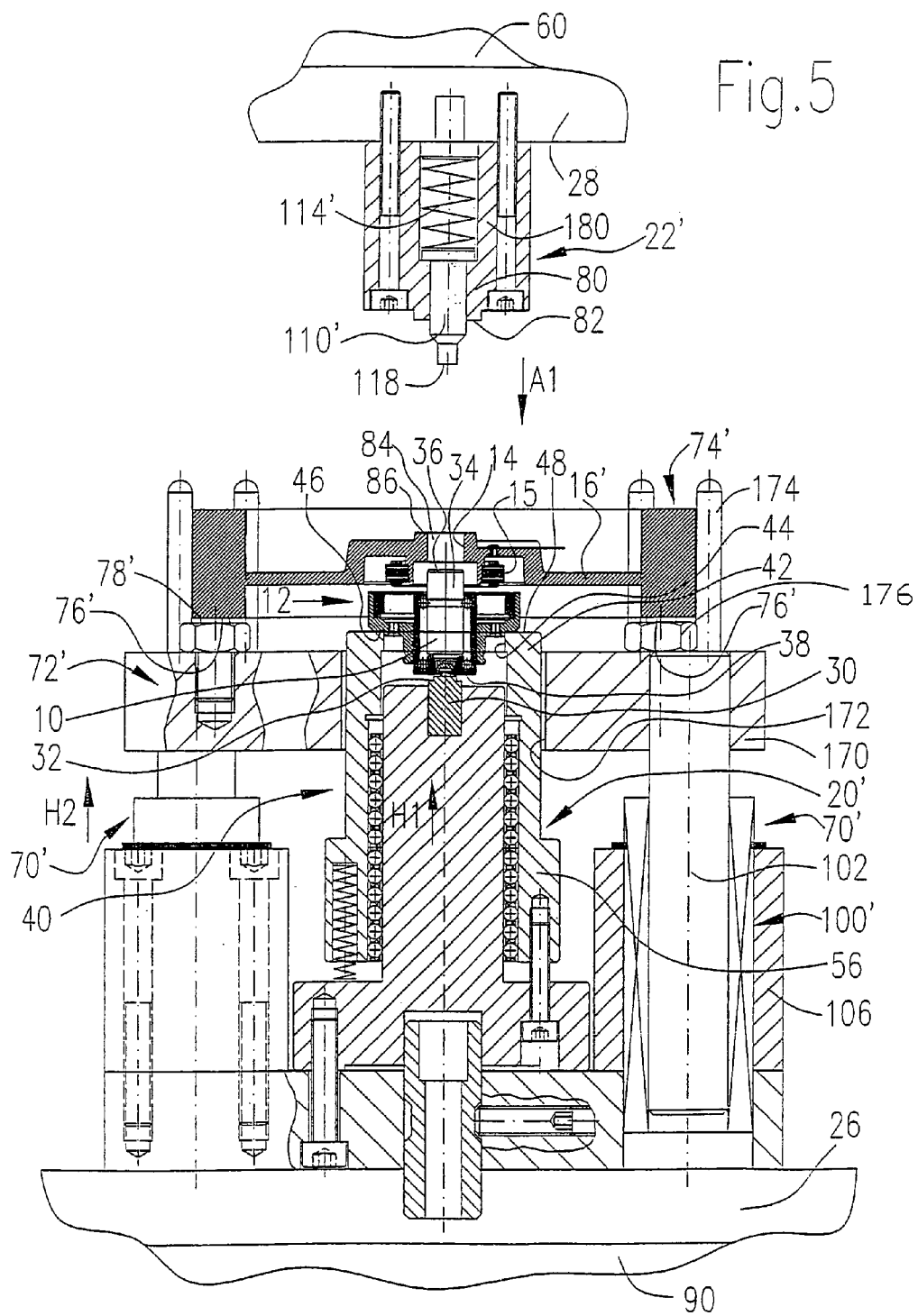

In a second embodiment illustrated in FIG. 5, the elements that are identical to the elements of the first embodiment are given the same reference numbers so that with regard to their description, full reference can be made to the details provided for the first embodiment.

In the second embodiment, the arrangement of the first pressing tool 20 in respect of the second pressing tool 22 with respect to the plunger 60 and to the counter support 90 is inverted. This means that the first pressing tool 20' is held on the counter support 90 by its base 26 while the second pressing tool 22' is held by its base 28 at the plunger 60.

As to the construction of the rotor carrier 42 and the first pressing element 30, the first pressing tool 20' is formed in an identical way to the first embodiment, with the difference, however, that the rotor receiving portion 44 no longer needs negative pressure to hold the rotor 12 but rather the rotor 12 remains in the rotor receiving portion 44 due to the force of gravity.

In contrast to the first embodiment, however, the second aligning apparatus 70' is not associated with the second pressing tool 22' but rather with the first pressing tool 20', since the stator housing 16' has reference surfaces 76' that are located on the side of the stator housing 16' from which the shaft 10 is pressed into the shaft receiving portion 14.

The second aligning apparatus 70' thus has a carrying member 170 as stator carrier 72' which encloses the first guide sleeve 56 from the outside, the first guide sleeve 56 engaging through a central opening 172 in the carrying member 170.

This carrying member 170 is then movably guided on a plurality of second guides 100', three by way of example, with respect to the base 26, the guides likewise comprising second guide columns 102 and second guide sleeves 106. The guide sleeve 106 is connected firmly to the base 26 whereas the guide column 102 is connected firmly to the carrying member 170 of the stator carrier 72'.

In the second embodiment, the stator receiving portion 74' is formed by means of alignment pins 174 which project beyond the carrying member 170 in the direction of the second pressing tool 22' and fit snugly against corresponding alignment surfaces of the stator housing 16'.

In addition, the reference surfaces 76' of the stator housing 16' abut second support surfaces 78' that can be adjusted with respect to the carrying member 170 by means of adjusting elements 176 in order to preset the exact alignment of the stator housing 16'.

In the second aligning apparatus 70' as well, a force is exerted on the stator receiving portion 72' in the direction of the starting position by means of an elastic force storage unit, not illustrated in the drawings, with the generation of holding force H2 which acts in the same direction as holding force H1 of the first aligning apparatus 40.

In contrast to the first embodiment, in the second embodiment the second pressing tool 22' only comprises the pressing element 80 with the pressing surface 82, and the centering pin 110' is further disposed in a column member 180 carrying the second pressing element 80 and has a force exerted on it by a force storage unit 114' so that, on the one hand, the centering pin 110' also centers the stator housing 16' by engaging into the shaft receiving portion 14 and, on the other hand, can still act on the end face 36 of the pressfit end 34 to ensure that the disk supporting surface 46 of the rotor 12 abuts the first support surface 48 when the stator housing 16' is lowered, despite the incipient magnetic interaction between the rotor 12 and then stator 15, and does not thus disengage from the rotor receiving portion 44.

The second embodiment of the device according to the invention now functions such that initially the first pressing tool 20' and the second pressing tool 22' are again pushed apart from each other in order to first place the rotor 12 in the rotor carrier 42 and then to put the stator housing 16' on the stator carrier 72'.

Due to the force of gravity, the disk supporting surface 46 and the first support surface 48 lie against each other as do the reference surfaces 76' and the second support surfaces 78'.

The starting position of the rotor carrier 42 corresponds to the starting position of the first aligning apparatus 40 described in the first embodiment and the starting position of the second aligning apparatus 70' holds the stator housing 16' such that there is a space between the end face 36 and the pressfit opening 84. Moreover, the second pressing element 80 with the second pressing surface 82 is already spaced at a distance from the contact surface 86 of the stator housing 16'.

By conveying the second pressing tool 22' in the direction of the first pressing tool 20' the centering pin 110' initially penetrates the shaft receiving portion 14 and thus centers the stator housing 16' in the manner described above. The centering pin 110' furthermore penetrates the shaft receiving portion 14 and then, with its front end 118, exerts a force on the end face 36 of the shaft 10, generating the first applying force A1, which results in the fact that at the start of the pressfitting process, the disk supporting surface 46 cannot lift away from the first support surface 48 due to the magnetic interaction between the rotor 12 and the stator 15.

Owing to the changes in the arrangement of the second aligning apparatus 70' brought about by the relocation of the reference surfaces 76' to the front of the stator housing 16', the magnetic interaction between the rotor 12 and the stator 15 does not cause the mounting surfaces 76' to lift away from the second support surfaces 78', but rather presses them together so that there is no longer need to generate a second applying force to prevent the mounting surfaces 76' from lifting away from the second support surfaces 78'.

When the second pressing tool 22' is conveyed in the direction of the first pressing tool 20', the second pressing surface 82 comes to rest against the contact surface 86 and, with a continued movement of the second pressing tool 22' in the direction of the first pressing tool 20', causes the stator housing 16' to be pushed, against holding force H2 of the second aligning apparatus 70', in the direction of the rotor 12 and continuing until the pressfit end 34 of the shaft 10 comes to rest against the pressfit opening 84.

As the second pressing tools 22' continues to be conveyed in the direction of the first pressing tool 20', the rotor 12 together with the rotor carrier 42 is moved, overcoming the first holding force H1, until the end face 38 of the shaft 10 also abuts the first pressing surface 32. This means that at the start of the pressfitting process in which the pressfit end 34 of the shaft 10 is pressed into the shaft receiving portion 14, a precise alignment of the rotor 12 and the stator housing 16' with respect to each other is achieved since, similarly to the first embodiment, the disk supporting surface 46 is pressed against the first support surface 48 with first holding force H1 and, in addition, the mounting surfaces 76' are pressed against the second support surfaces 78' with second holding force H2. When the second pressing tool 22' is conveyed further in the direction of the first pressing tool 20', with the precise alignment of the rotor 12 to the stator housing 16', the pressfit end 34 is pressed into the shaft receiving portion 14 in the same way as described in detail in relation to the first embodiment.

Concerning the parts that are identical to those in the first embodiment and the processes of pressing the pressfit end 34 into the shaft receiving portion 14 that have not been expressly described in relation to the second embodiment, reference is made in full to the embodiments relating to the first embodiment.

IDENTIFICATION REFERENCE LIST

10 Shaft
11 Pair of bearings
12 Rotor
14 Shaft receiving portion
15 Stator
16 Stator housing
18 Pressing device
20 1st pressing tool
22 2nd pressing tool
24 Pressing direction
26 1st base
28 2nd base
30 1st pressing element
32 1st pressing surface
34 Pressfit end
36 End face of the shaft 10
38 End face of the shaft 10
40 First aligning apparatus
42 Rotor carrier
44 Rotor receiving portion
45 Suction connection
46 Disk supporting surface
47 Rotor hub
48 First support surface
50 First guide
52 First guide column
54 Rolling elements
56 First guide sleeve
58 First spring element
60 Plunger
62 End 64 Sleeve surface
65 Rolling element cage
66 Inner surface
68 Cylinder axis
70 Second aligning apparatus
72 Stator carrier
74 Stator receiving portion
76 Reference surfaces, mounting surface
77 Hub member
78 Second support surface
80 2nd pressing element
82 2nd pressing surface
84 Pressfit opening
86 Contact surface
90 Counter support
100 Second guide
102 Second guide column
104 Rolling elements
106 Second guide sleeve
108 Second spring element
110 Centering pin, force transmission element
112 Guide bolt
114 Pressure cylinder
116 Direction of pressure
118 End face
120 Holding-down apparatus
122 Holding-down device, applying element, force transmission element
124 Pressure springs
126 Bore
128 Bore
130 Measuring device
132 Measuring probe
134 Sensor contact surface
136 Probe holder
138 Probe needle
140 Appendage
142 Guide column
144 Guide column
146 Cross bar
148 Drive motor
150 Hollow shaft
152 Coupling
154 Spindle nut
156 Sliding spindle
158 Flange
160 Force sensor
162 Pressing control
170 Carrying member
172 Opening
174 Alignment pins
176 Adjusting elements
180 Column member
H1 First holding force
H2 Second holding force
A1 First applying force
A2 Second applying force

The invention claimed is:

1. A device to press a shaft rotatably supporting a rotor of a spindle motor for a hard disk drive into a shaft receiving portion of an associated stator housing non-rotatably receiving said shaft, comprising:
   a first pressing tool,
   a second pressing tool,
   a first aligning apparatus for the rotor and a second aligning apparatus for the stator housing, the first and the second aligning apparatus adapted to guide the rotor in a precisely aligned state at least from a start of the pressfitting process with a precision-related surface of the rotor engaging against a first support surface of a rotor carrier of the first aligning apparatus, and guide the stator housing in a precisely aligned state at least from the start of the pressfitting process with one or more precision-related surfaces of the stator housing abutting a second support surface of a stator carrier of the second aligning apparatus, said rotor carrier and said stator carrier being exactly aligned with respect to each other during the pressfitting process,
   the first pressing tool having a first pressing element acting on the shaft of the rotor independent of the first aligning apparatus and the second pressing tool having a second pressing element acting on the stator housing independent of the second aligning apparatus, the first and second pressing elements abutting against the shaft or the stator housing respectively at least at the start of the pressfitting process.

2. The device according to claim 1, wherein the first aligning apparatus is associated with the first pressing tool.

3. The device according to claim 1, wherein the first support surface of the rotor carrier is adapted to be movably guided with respect to the first pressing element.

4. The device according to claim 1, wherein the rotor carrier is movably guided by means of at least one first linear guide of the first aligning apparatus.

5. The device according to claim 4, wherein the first linear guide is supported by rolling element bearings.

6. The device according to claim 5, wherein the first linear guide comprises a first guide column and a first guide sleeve that is movable with respect to the guide column.

7. The device according to claim 6, wherein the rotor carrier is mounted on the first guide sleeve.

8. The device according to claim 6, wherein the first pressing element is mounted on the guide column.

9. The device according to claim 1, wherein:
   the rotor carrier is adapted be moved in the direction of the pressing tool located opposite the rotor carrier until the rotor carrier reaches a starting position,
   a first holding force acting in a direction of the starting position is exerted on the rotor carrier in the starting position,
   the rotor supported by the rotor carrier, in the starting position with the shaft, is spaced from the first pressing element, and
   a movement of the rotor with the shaft in a direction of the first pressing element acts against the first holding force.

10. The device according to claim 9, wherein the first holding force is less than 1.5 times a preload force of a pair of bearings provided between the shaft and the rotor.

11. The device according to claim 9, wherein the first holding force is generated by an energy or force storage unit acting between the rotor carrier and a base of the first pressing tool.

12. The device according to claim 1, wherein the second aligning apparatus is associated with the second pressing tool.

13. The device according to claim 1, wherein the second aligning apparatus is associated with the first pressing tool.

14. The device according to claim 1, wherein the second support surface of the stator carrier is adapted to be movably guided with respect to the second pressing element.

15. The device according to claim 14, wherein the stator carrier is movably guided by at least one second linear guide of the second aligning apparatus.

16. The device according to claim 15, wherein the second linear guide is supported by rolling element bearings.

17. The device according to claim 15, wherein the second linear guide comprises a second guide column and a second guide sleeve which is adapted to be moved with respect to the second guide column.

18. The device according to claim 17, wherein the stator carrier is mounted on the second guide sleeve.

19. The device according to claim 17, wherein the second pressing element is mounted on the second guide column.

20. The device according to claim 1, wherein:
the stator carrier is adapted to be moved in the direction of the pressing tool located opposite the stator carrier until the stator carrier reaches a starting position,
a second holding force acting in a direction of the starting position is exerted on the stator carrier in the starting position,
the stator housing held by the stator carrier is spaced at a distance from the second pressing element, and
the second holding force acts against a movement of the stator housing with the stator carrier in a direction of the second pressing element.

21. The device according to claim 20, wherein the second holding force is generated by an energy or force storage unit acting between the stator carrier and a base of the associated pressing tool.

22. The device according to claim 1, wherein a centering element for the stator housing is provided.

23. The device according to claim 22, wherein the centering element acts on the shaft receiving portion of the stator housing.

24. The device according to claim 1, further comprising a press drive for driving the first and second pressing tools.

25. The device according to claim 24, wherein the press drive comprises a spindle drive.

26. A device to press a shaft rotatably supporting a rotor of a spindle motor for a hard disk drive into a shaft receiving portion of an associated stator housing, comprising:
a first pressing tool,
a second pressing tool,
a first aligning apparatus for the rotor and a second aligning apparatus for the stator housing, the first and the second aligning apparatus adapted to guide the rotor by means of a rotor carrier, and to guide the stator housing by means of a stator carrier, said rotor carrier and said stator carrier being exactly aligned with respect to each other during a pressfitting process, the first pressing tool having a first pressing element acting on the shaft of the rotor independent of the first aligning apparatus and the second pressing tool having a second pressing element acting on the stator housing independent of the second aligning apparatus, the first and second pressing elements abutting against the shaft or the stator housing respectively at least at the start of the pressfitting process, and
a first force transmission element disposed on the second pressing tool for generating a first applying force for pressing a precision-related surface of the rotor against a first support surface of the rotor carrier before the pressfitting process begins.

27. A device to press a shaft rotatably supporting a rotor of a spindle motor for a hard disk drive into a shaft receiving portion of an associated stator housing, comprising:
a first pressing tool,
a second pressing tool,
a first aligning apparatus for the rotor and a second aligning apparatus for the stator housing, the first and the second aligning apparatus adapted to guide the rotor by means of a rotor carrier, and to guide the stator housing by means of a stator carrier, said rotor carrier and said stator carrier being exactly aligned with respect to each other during a pressfitting process,
the first pressing tool having a first pressing element acting on the shaft of the rotor independent of the first aligning apparatus and the second pressing tool having a second pressing element acting on the stator housing independent of the second aligning apparatus, the first and second pressing elements abutting against the shaft or the stator housing respectively at least at the start of the pressfitting process, and
a second force transmission element is disposed on the first pressing tool for generating a second applying force for pressing a precision-related surface of the stator housing against a second support surface of the stator carrier before the start of the pressfitting process.

28. The device according to claim 1, wherein, as a stator carrier, the second aligning apparatus has a carrying member guided by a plurality of linear guides.

29. The device according to claim 28, wherein the carrying member has a plurality of second support surfaces to support the precision-related reference surfaces of the stator housing.

* * * * *